United States Patent [19]

Mautino

[11] Patent Number: 5,161,927
[45] Date of Patent: Nov. 10, 1992

[54] PEDESTAL-TYPE SUPPORT APPARATUS

[75] Inventor: Peter S. Mautino, Verona, Pa.

[73] Assignee: McConway & Torley Corporation, Pittsburgh, Pa.

[21] Appl. No.: 684,580

[22] Filed: Apr. 12, 1991

[51] Int. Cl.$^5$ .................................................. B60P 7/08
[52] U.S. Cl. ........................................ 410/72; 410/83; 410/73
[58] Field of Search .................... 410/72, 73, 82, 83, 410/84, 90, 91, 44, 52, 54, 68, 70

[56] References Cited

U.S. PATENT DOCUMENTS

| | | | |
|---|---|---|---|
| 3,321,162 | 5/1967 | Connerat | 410/73 |
| 3,547,048 | 12/1970 | Miller | 410/73 |
| 3,556,449 | 1/1971 | Connerat et al. | 410/73 |
| 3,716,268 | 2/1973 | Arrey | 410/72 |
| 3,776,169 | 12/1973 | Strecker | 410/83 X |
| 3,805,709 | 4/1974 | Schuller et al. | 410/73 X |
| 4,131,071 | 12/1978 | Glassmeyer | 410/83 X |
| 4,430,032 | 2/1984 | Morgan | 410/68 |
| 4,597,701 | 7/1986 | DeWitt | 410/77 |
| 4,758,123 | 7/1988 | Corompt | 410/83 X |
| 4,826,371 | 5/1989 | Brown | 410/72 X |
| 4,844,672 | 7/1989 | Yurgevich | 410/54 |

Primary Examiner—Frank E. Werner
Assistant Examiner—James Eller
Attorney, Agent, or Firm—James Ray & Associates

[57] ABSTRACT

The present invention provides a castable pedestal-type support apparatus for a cargo shipping container. Such support apparatus includes a body member having a pair of side wall portions and a connecting wall portion disposed midway between the side wall portions. A generally rectangular end wall portion is disposed at a first end of the side wall portions. At least one aperture is formed through the end wall portion. A pivot pin receiving portion having an aperture formed therethrough is disposed intermediate the side wall portions closely adjacent a second end thereof. A counterweight is disposed intermediate the pair of side wall portions to provide a predetermined force required to pivot the support apparatus.

20 Claims, 4 Drawing Sheets

PEDESTAL-TYPE SUPPORT APPARATUS

FIELD OF THE INVENTION

The present invention relates, in general, to equipment useful in supporting a cargo shipping container in a predetermined position on a generally flat bottom-type transportation vehicle so that it can be secured thereto with a predetermined style cargo shipping container locking mechanism and, more particularly, this invention relates to pedestal-type support apparatus for use in this application which can be cast as an integral single piece unit.

BACKGROUND OF THE INVENTION

It is generally well known, prior to the present invention, that cargo shipping containers have been both supported on and connected to generally flat bottom-type transportation vehicles. Such vehicles have included railway-type flat cars, flat bed trucks as well as other lading-type transport vehicles such as ocean going vessels. In general, the equipment that has normally been used in this application as supporting members for such shipping containers consisted of pedestal supports which are manually adjustable along the length of the deck portion of the particular transport vehicle being used. The manual adjustment required normally will depend upon the overall length of the shipping container to be supported.

However, because the locking mechanisms that had been used in securing these shipping containers to such support pedestals have been supplied by different manufacturers, such support pedestals will not work with each style locking mechanism that is presently available for use in this particular application in the transportation industry. Even though these pedestals normally support the cargo shipping containers adjacent each corner, there are specific operating conditions which can be encountered of which additional support is required or at least desirable. Consequently, such support pedestals have also been used to support these shipping containers intermediate the ends thereof in addition to supporting them at their corners. As is generally well recognized in the art, such cargo shipping containers can be of various lengths and shapes. For example, if these cargo shipping containers are to be used at sea, then they may require a special shape. Additionally, the flat bottom-type vehicles used for transporting such shipping containers over land have, in most cases, been adapted to carry more than the one such shipping container. Such shipping containers may be stacked, for example, two high on these vehicles in certain instances. This is particularly the case when such shipping containers are transported on railway-type equipment. In fact, in the railway industry, rail cars have been specifically designed for use in this particular application. There is a pedestal-type cargo shipping container locking device and support mechanism taught in U.S. Pat. No. 4,430,032, for example. Another example of the equipment used in this application is taught in U.S. Pat. No. 4,597,701 and still yet another example is taught in U.S. Pat. No. 4,844,672.

U.S. Pat. No. 4,430,032 teaches a cargo shipping container retaining apparatus that is specifically designed for a transporting vehicle having a flat deck. This particular retaining apparatus requires that the cargo shipping container have a corner fitting disposed on at least each of the four corners thereof. Furthermore, it is necessary for these corner fittings to be in substantially the same horizontal plane. As illustrated in this reference, such corner fittings must include a slot-like portion which receives therein a latch lever. Such latch lever is used for locking the shipping container to the deck portion of the transport vehicle. In order to releasably support each corner of the cargo shipping container, a separate support pedestal is provided. This support pedestal includes a frame member having a base portion, a platform portion spaced above such base portion and end and side wall portions which extend vertically of such platform portion and conform to a corner fitting as the shipping container is lowered onto the platform portion. In this arrangement, at least one of the side wall portions includes a slot-like portion formed therein. This slot-like portion extends in a vertical direction along such at least one side wall portion. The latch lever extends along the slot-like portion between parallel walls which form such slot-like portion. Further provided in this retaining apparatus, is a variable pivot for the latch lever. Such variable pivot enables pivoting the latch lever between the parallel walls of such slot-like portion. The latch lever, in this manner, can move into the slot-like portion and into latching engagement with an associated corner fitting disposed on the cargo shipping container. The latch lever includes an inwardly extending upper end portion, and the upper end portion includes an upwardly facing strike surface. The lower end portion of such latch lever is designed to extend a substantial distance beneath the platform. This particular apparatus also includes a compression spring that engages the lower end portion of such latching lever. This compression spring is provided to bias the latching lever to engage the strike surface with a corner fitting as such cargo shipping container is being lowered onto the platform. The compression spring includes a moveable seat member disposed adjacent the lower end of the latching lever and a saddle member disposed on the end that is opposite the moveable seat member. This saddle member is adjacent the lower end portion of the latch lever. In addition, a stationary seat member is provided at the outermost end of the compression spring. The saddle member is positioned for bearing engagement with the lower end portion of the latching lever. The moveable seat member for the compression spring includes a leg portion which extends along such compression spring for at least a portion of the length thereof and a lock bar member engageable with such leg portion. This lock bar member reacts against the moveable seat member and an adjacent wall defining a slot. In this manner, compression of the spring is prevented and thereby securely locking the latching lever from being accidentally moved to an undesired release position during service.

Taught in U.S. Pat. No. 4,597,701 is another fastener device used for engagement with a corner casting of a cargo shipping container to thereby secure such shipping container to a flat support of a transport vehicle. As taught therein, this corner casting is hollow and includes a planar surface abutting and parallel to such flat support of the transport vehicle. This fastener device includes a hook member which is adapted to penetrate an aperture defined through such planar surface and a pivot means for coupling such hook member to the flat support on the transport vehicle. This pivot means is positioned for movement parallel to the planar surface relative to the flat support. This arrangement enables movement of the hook member from a first position located outside the corner casting disposed on such cargo shipping container to a second position of penetration of such corner casting. In other words, from a non-secured position into a secured position so that locking a wall of the corner casting between the hook member and the flat support is achieved. Furthermore, this pivot means maintains a constant spacial interval from a pivot point to the planar surface during all positions of penetration of the hook member into such aperture. As a result, during operation, such moveable pivot means allows the point of attack of such hook member penetrating into the aperture to be varied in a manner to best match the position and orientation of the aperture. Such penetration of the aperture by the hook member is achieved without towards and away movement of the pivot point from such planar surface.

Finally, U.S. Pat. No. 4,844,672 teaches a wide body-type cargo shipping container that is attached for engagement with certain wide body shipping container support mechanisms disposed on various types of transport vehicles. This is accomplished through the provision of a plurality of adapters that are moveably mounted with respect to supporting points disposed on the bottom portion of the wide body shipping containers. Each of these adapters is moveable to a position beneath the wide body shipping container supporting point and is engageable therewith in a manner which defines a new supporting structure. Such new supporting structure being spaced laterally inward from the outermost surface of such wide body shipping container so as to permit coupling of such shipping container to a standard width container support mechanism.

SUMMARY OF THE INVENTION

The present invention provides a castable pedestal-type support apparatus useful in supporting a cargo shipping container in a predetermined position on a flat bottom-type transportation vehicle. In addition to supporting the shipping container, such pedestal-type support apparatus enables it to be secured to the transportation vehicle by a predetermined style locking mechanism. Such castable pedestal-type support apparatus comprises a body member having a predetermined configuration. This body member includes a pair of substantially identical and substantially parallel side wall portions. Each of such pair of side wall portions have a predetermined shape, a predetermined overall maximum length, a predetermined overall maximum width as well as a predetermined thickness. The body member also has a generally rectangular end wall portion disposed at and connected to a first end of each of such pair of side wall portions. This end wall portion has each of a predetermined length, a predetermined width and a predetermined thickness. Finally, such body portion includes a connecting wall portion disposed substantially midway between each axially opposed outer edge of such pair of side wall portions. Such connecting wall portion is connected to an inner surface of each of the pair of side wall portions along the length thereof and to an inner surface of such end wall portion along a width thereof. Such connecting wall portion extends from such inner surface of the end wall portion toward a second axially opposed end of such pair of side wall portions for a predetermined distance. Such pedestal-type support apparatus has at least one aperture having a predetermined configuration formed through a predetermined portion of such end wall portion of the body member. Such at least one aperture receives at least a portion of the locking mechanism therein to enable securing the cargo shipping container to such transportation vehicle. There is a pivot pin receiving portion disposed intermediate such pair of side wall portions and is located closely adjacent the second end of such pair of side wall portions. Such pivot pin receiving portion has a predetermined configuration and extends outwardly from a respective outer surface of each of a pair of side wall portions for a predetermined distance. An aperture is formed through this pivot pin receiving portion which receives therein a portion of a pivot pin that both secures the pedestal-type support apparatus to the transportation vehicle and enables such pedestal-type support apparatus to be pivoted from a first inoperative cargo shipping container supporting position into a second operative cargo shipping container supporting position. A final essential element of such castable pedestal-type support apparatus is a counterweight means. This counterweight means is disposed intermediate a portion of each such inner surface of the pair of side wall portions and adjacent the second end of such pair of side wall portions. Such counterweight means provides a predetermined force that will be necessary to pivot the pedestal-type support apparatus from such first inoperative shipping container supporting position into such second operative shipping container supporting position.

OBJECTS OF THE INVENTION

It is, therefore, one of the primary objects of the present invention to provide an improved cargo shipping container pedestal-type support apparatus which can be easily cast as an integral single piece unit.

Still another object of the present invention is to provide an improved cargo shipping container pedestal-type support apparatus which, during the useful life thereof, is essentially maintenance free.

Yet another object of the present invention is to provide an improved cargo shipping container pedestal-type support apparatus which is relatively lightweight.

A further object of the present invention is to provide an improved cargo shipping container pedestal-type support apparatus which is designed to require a minimal amount of force to pivot such apparatus from a first inoperative cargo shipping container supporting position into a second operative cargo shipping container supporting position.

An additional object of the present invention is to provide an improved cargo shipping container pedestal-type support apparatus which is relatively inexpensive to manufacture.

Still yet another object of the present invention is to provide an improved cargo shipping container pedestal-type support apparatus which will require a minimal amount of machining.

Still yet another object of the present invention is to provide an improved cargo shipping container pedestal-type support apparatus which is relatively simple to install.

A still further object of the present invention is to provide an improved cargo shipping container pedestal-type support apparatus which does not require any special tools during installation.

It is an additional object of the present invention to provide an improved cargo shipping container pedestal-type support apparatus which can be retrofitted to existing flat bottom-type transportation vehicles without any modifications of such transportation vehicles.

Another object of the present invention is to provide an improved cargo shipping container pedestal-type support apparatus having a cavity disposed on the support end to receive the particular-type locking mechanism therein thereby eliminating a need for a special locking mechanism.

In addition to the above described objects and advantages of the improved castable cargo shipping container pedestal-type support apparatus, various other objects and advantages of the present invention will become more apparent to those persons who are skilled in the cargo shipping container pedestal-type support art from the following, more detailed description of the invention, particularly, when such description is taken in conjunction with the attached drawing figures and with the appended claims.

DESCRIPTION OF THE VARIOUS EMBODIMENTS OF THE PRESENT INVENTION

Figure 1:
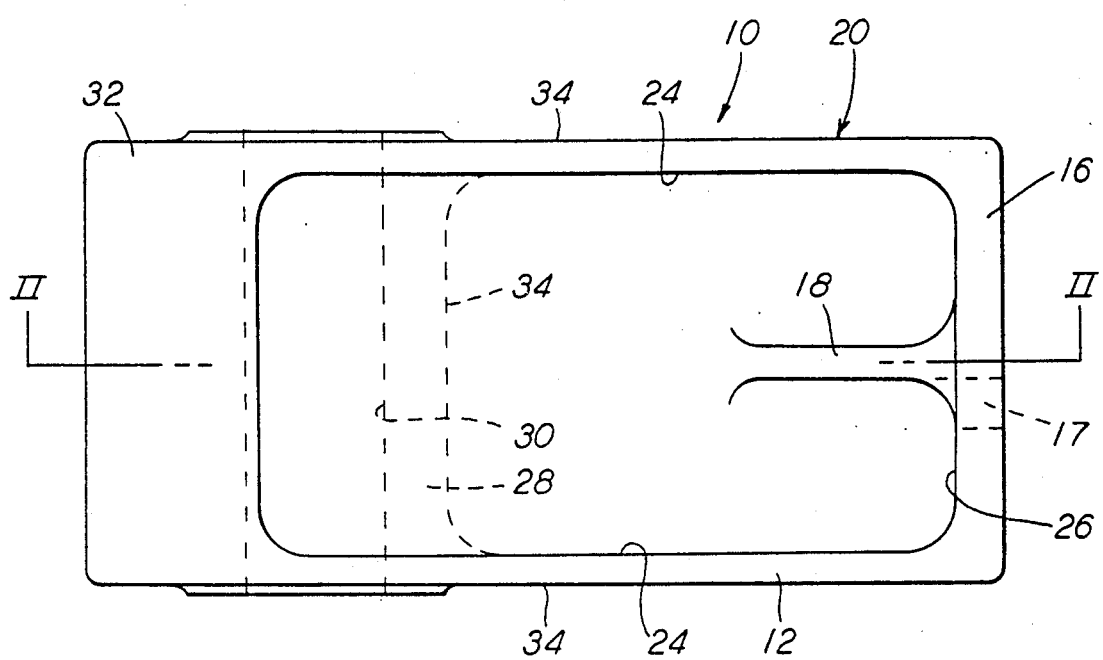
FIG. 1 is a top view of a presently preferred embodiment of the improved pedestal-type support apparatus for a cargo shipping container produced according to the present invention.

Prior to proceeding to the more detailed description of the improved cargo shipping container pedestal-type support apparatus, it should be noted that, throughout the several views illustrated in the attached drawings, identical components which have associated therewith identical functions have been identified with identical reference numerals for the sake of clarity.

Figure 3:
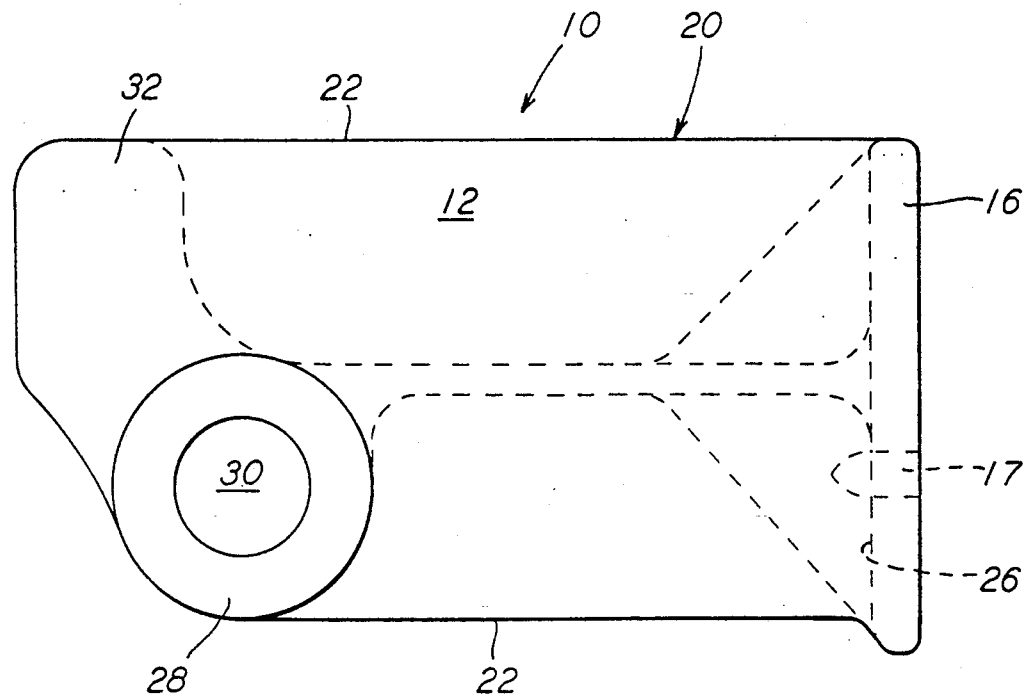
FIG. 3 is an end view of the cargo shipping container pedestal-type support apparatus of the present invention illustrated in FIGS. 1 and 2.
Figure 4:
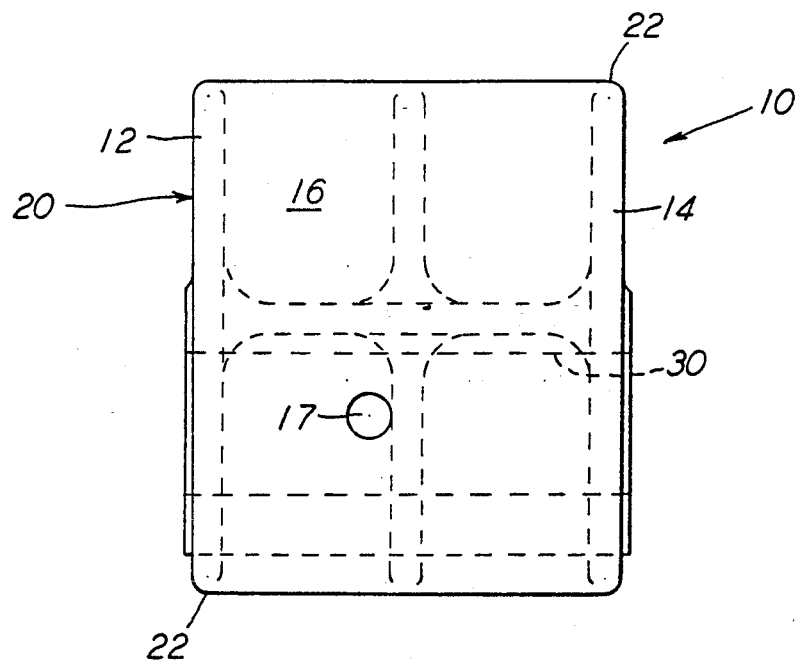
FIG. 4 is a side elevation view of an elevated embodiment of a cargo shipping container pedestal-type support apparatus of the present invention.

Now refer, more particularly, to FIGS. 1 and 3 illustrated therein for a castable pedestal-type support apparatus, generally designated 10, for supporting a cargo shipping container (not shown) in a predetermined portion on a flat bottom-type transportation vehicle (not shown). Such pedestal-type support apparatus 10 enables such cargo shipping container to be secured to such transportation vehicle by a predetermined style locking mechanism (not shown). This castable pedestal-type support apparatus 10 comprises a body member, generally designated 20. The body member 20 includes a pair of substantially identical and substantially parallel spaced side wall portions 12 and 14. Each of such pair of side wall portions 12 and 14 have a predetermined shape as well as a predetermined overall maximum length and a predetermined overall maximum width and a predetermined thickness.

According to the presently preferred embodiment of the invention, such predetermined overall maximum length will preferably be between about 14.719 inches and about 14.781 inches. Such predetermined overall maximum width of the pair of side wall portions 12 and 14 will preferably be between about 7.599 inches and about 7.661 inches. While the predetermined thickness of such pair of side wall portions 12 and 14 will preferably be about 0.485 inches and about 5.13 inches. The body member 12 also includes a generally rectangular end wall portion 16 disposed at and connected to a first end of each of such pair of side wall portions 12 and 14. This end wall portion 14 will have each of a predetermined length, a predetermined width and a predetermined thickness.

In the presently preferred embodiment of the invention, such predetermined length of the end wall portion 16 will preferably be between about 8.219 inches and about 8.281 inches. The preferred predetermined width of such end wall portion 16 will be between about 6.969 inches and about 7.031 inches and the predetermined thickness will preferably be between about 0.740 inches and about 0.76 inches.

The final essential element of the body member 20 is a connecting wall portion 18 that is disposed substantially midway between each axially opposed outer edge 22 of such pair of side wall portions 12 and 14. The connecting wall portion 18 is connected to an inner surface 24 of such each of the pair of side wall portions 12 and 14 as well as being connected to an inner surface 26 of the end wall portion 16. This connecting wall portion 18 extends from the inner surface 26 of such end wall portion 16 towards a second axially opposed end of such pair of side wall portions 12 and 14 for a predetermined distance.

The pedestal-type support apparatus 10 further includes at least one aperture 17 having a predetermined configuration formed through a predetermined portion of such end wall portion 16 of the body member 20. Such aperture 17 receives at least a portion of such particular style locking mechanism therein to enable securing the cargo shipping container to such transportation vehicle. It should be noted that the particular style locking mechanism for use with this pedestal-type support apparatus 10 is manufactured by the Holland Corporation.

In the presently preferred embodiment of the invention, the predetermined configuration of this at least one aperture 17 formed through the end wall portion 16 of the body member 20 will preferably be generally round and have a predetermined diameter. Such predetermined diameter of the at least one aperture 17 will generally be between about 0.75 inch and about 0.80 inch.

The apparatus 10 further includes a pivot pin receiving portion 28 disposed intermediate the pair of side wall portions 12 and 14. Such pivot pin receiving portion 28 is also located closely adjacent the second end of such pair of side wall portions 12 and 14. The pivot pin receiving portion 28 has a predetermined configuration which, according to the presently preferred embodiment of the invention, is generally circular and has a predetermined diameter. Such predetermined diameter of the generally circular pivot pin receiving portion 28 will generally be between about 4.125 inches and about 4.375 inches. An aperture 30 is formed through such pivot pin receiving portion 28. Such aperture 30 receives therein a portion of a pivot pin (not shown) which both secures the pedestal-type support apparatus 10 to such transportation vehicle and enables the pedestal-type support apparatus to be pivoted from an inoperative first cargo shipping container supporting position into an operative second cargo shipping container supporting position. In the presently preferred embodiment, the aperture 30 formed through such pivot pin receiving portion 28 will generally be round and have a diameter of between about 2.260 inches and about 2.2275 inches. The final essential element of the pedestal-type support apparatus 10 is a counterweight means 32 disposed intermediate and connected to a portion of each such inner surface 24 of the pair of side wall portions 12 and 14 adjacent the second end of such pair of side wall portions 12 and 14. Such counterweight means 32 provides a predetermined force that will be required to pivot such pedestal-type support apparatus from the inoperative first shipping container supporting position into such operative second shipping container supporting position. In the presently preferred embodiment, this counterweight means 32 is a thickened wall section. Further, in this embodiment, such predetermined force required to pivot the pedestal-type support apparatus 10 provided by such counterweight means 32 will generally be less than about 65 pounds and, more preferably, less than about 50 pounds.

Figure 2:
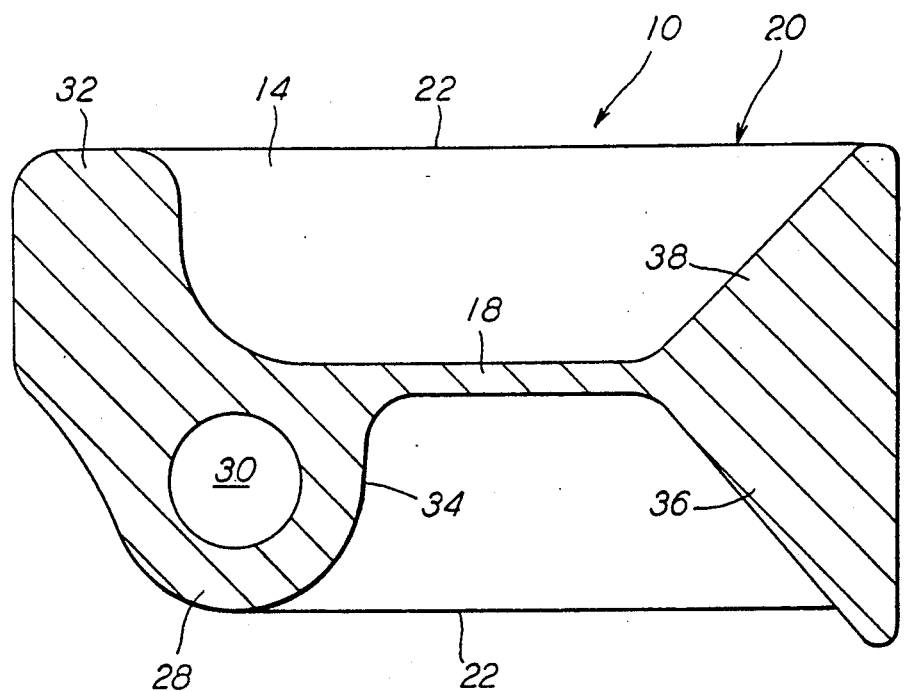
FIG. 2 is a cross sectional view taken along the lines II—II of the cargo shipping container pedestal-type support apparatus of the present invention illustrated in FIG. 1.

In the preferred embodiment of the invention illustrated in FIG. 2, the connecting wall portion 18 preferably extends from the inner surface 26 of such end wall portion 16 to a predetermined portion of an outer surface 34 of such pivot pin receiving portion 28. Likewise, in this preferred embodiment of the invention as best seen in FIGS. 2 and 3, the body member 20 further includes a pair of reinforcing wall portions 36 and 38 having a predetermined configuration. Such reinforcing wall portions are disposed at the first end of such pair of side wall portions 12 and 14. One of such reinforcing wall portions 36 and 38 being disposed on a first side of such connecting wall portion 18 and a second of such reinforcing wall portions 36 and 38 being disposed on an axially opposed second side of such connecting wall portion 18. In this embodiment, the predetermined configuration of each of the pair of reinforcing wall portions 36 and 38 is substantially triangular in shape. A first leg of each triangularly shaped reinforcing wall portions 36 and 38 being connected to a portion of an outer surface of such connecting wall portion 18 and a second leg of such triangularly shaped reinforcing wall portions 36 and 38 being connected to a portion of such inner surface 26 of the end wall portion 16 of such body member 20. It is presently preferred that the body member 20 and the pivot pin receiving portion 28 and such counter weight means 32 be cast as an integral single piece unit. It is further preferred that at least a first portion of such aperture 30 formed through the pivot pin receiving portion 28 be cast simultaneously with such integral single piece unit and that a final second portion of such aperture 30 formed through the pivot pin receiving portion 28 will be machined to a final diameter. It is also preferred that such at least one aperture 17 formed through the end wall portion 16 of the body member 20 also be simultaneously cast with such integral single piece unit. However, it is also possible for such at least one aperture 17 to be formed through such end wall portion 16 of the body member 20 by drilling. It is also possible that the aperture 30 formed through such pivot pin receiving portion 28 to be formed by drilling. In this preferred embodiment of the invention, the predetermined distance such pivot pin receiving portion 28 extends outwardly from each respective outer surface 34 of such pair of side wall portions 12 and 14 will generally be between about 0.125 inch and about 0.159 inch and that each outer end surface of such pivot pin receiving portion 28 will be machined.

Now refer, more particularly, to FIGS. 5 through 8. Illustrated therein is a presently preferred embodiment of the castable pedestal-type support apparatus 10 in which a cavity, generally designated 40, is formed in the end wall portion 16. Such cavity 40 has a predetermined configuration to accept therein a particular locking mechanism used to secure a cargo shipping container to a transportation vehicle. Provision of this cavity 40 enables the elimination of welding such locking mechanism to the pedestal-type support apparatus 10. The cavity 40, in the most preferred embodiment of the invention, includes a generally rectangular portion 42 disposed at the bottom thereof, a generally circular portion 44 having a predetermined diameter disposed above the rectangular portion 42 and a second generally circular portion 46 having a predetermined diameter greater than the predetermined diameter of the generally circular portion 44. A plurality of apertures 48 are formed through the end wall portion 16 to enable securing the locking mechanism to the support apparatus 10. Adjacent the inner surface 50 of the end wall portion 16, a flat surface 52 is provided adjacent each aperture 48 thereby providing a seat for the securement means used to connect the locking mechanism to the support apparatus 10.

Figure 5:
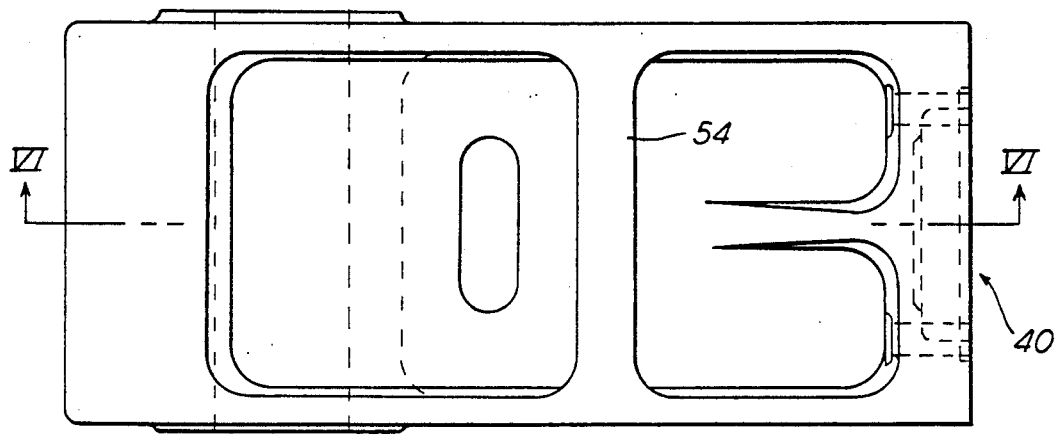
FIG. 5 is a plan view of a presently preferred embodiment of the improved pedestal-type support apparatus for a cargo shipping container.
Figure 6:
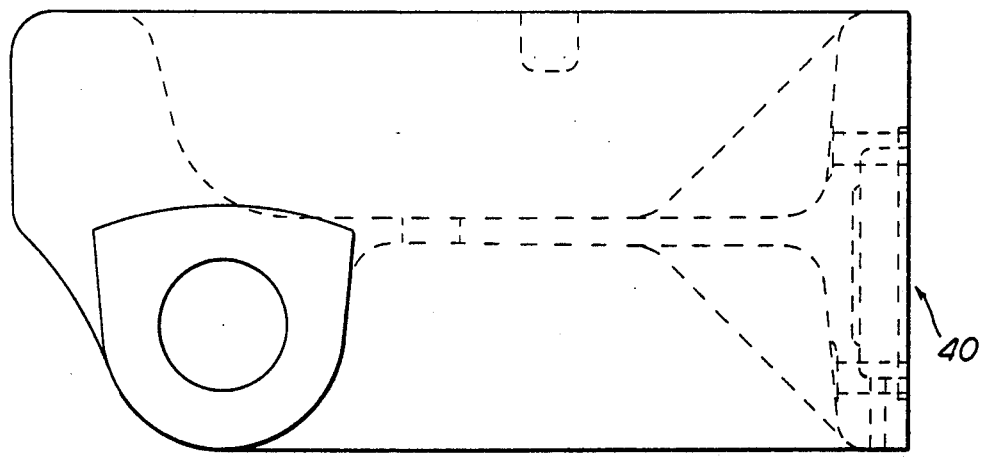
FIG. 6 is a side elevation view of the pedestal-type support apparatus illustrated in FIG. 5.
Figure 7:
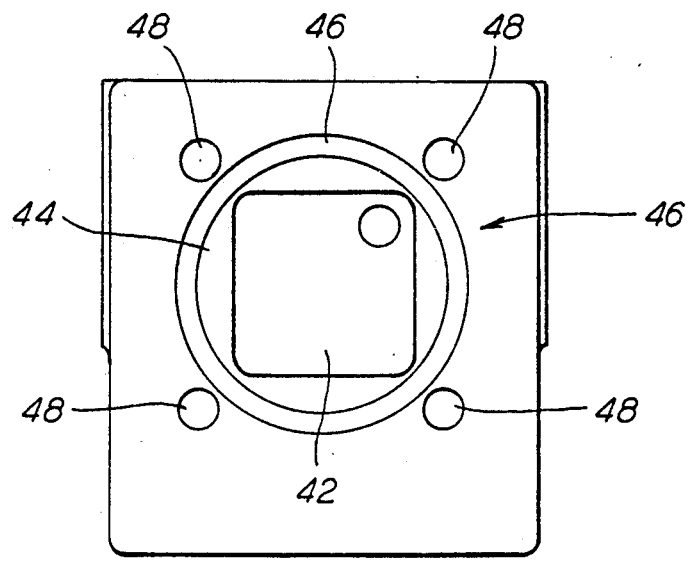
FIG. 7 is an end view of the pedestal-type support apparatus illustrated in FIGS. 5 and 6.
Figure 8:
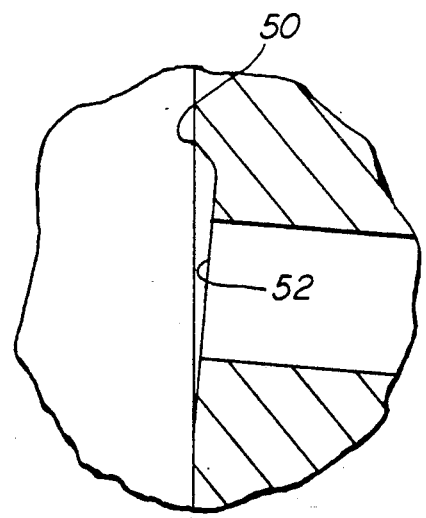
FIG. 8 is an enlarged view showing the backside of a seating arrangement for an aperture provided to enable securing the locking mechanism to the support apparatus.

As best seen in FIG. 5, the support apparatus 10 preferably includes a handle member 54 disposed between the pair of side wall portions 12 and 14 to enable pivoting the support apparatus 10 into and out of a cargo shipping container supporting position.

While a number of presently preferred and alternative embodiments of the castable pedestal-type support apparatus have been described in detail above with reference to the drawings, it should be understood that various modifications and adaptations of the present invention can be made by those persons who are skilled in the art without departing from the spirit and scope of the appended claims.

I claim:

1. A castable pedestal-type support apparatus for supporting a cargo shipping container in a position on a flat bottom-type transportation vehicle so that such shipping container can be secured thereto by a predetermined locking mechanism, said castable pedestal-type support apparatus comprising:
   (a) a body member having a predetermined configuration, said body member including,
      (i) a pair of substantially identical and substantially parallel side wall portions, each of said pair of side wall portions having each of a predetermined shape and a predetermined overall maximum length and a predetermined overall maximum width and a predetermined thickness,
      (ii) a generally rectangular end wall portion disposed at and connected to a first end of each of said pair of side wall portions, said end wall portion having a substantially flat outer surface portion and each of a predetermined length and a predetermined width and a predetermined thickness, and (iii) a connecting wall portion disposed substantially midway between each axially opposed outer edge of said pair of side wall portions and connected to an inner surface of said each of said pair of side wall portions and an inner surface of said end wall portion, said connecting wall portion extending from said inner surface of said end wall portion toward a second axially opposed end of said pair of side wall portions for a predetermined distance;

(b) at least one aperture having a predetermined configuration formed through a predetermined portion of said end wall portion of said body member to receive at least a portion of such locking mechanism therein to enable securing such cargo shipping container to such transportation vehicle;

(c) a pivot pin receiving portion disposed intermediate said pair of side wall portions and closely adjacent said second end of said pair of side wall portions, said pivot pin receiving portion having a predetermined configuration and extending outwardly from a respective outer surface of said each of said pair of side wall portions for a predetermined distance;

(d) an aperture formed through said pivot pin receiving portion for receiving therein a portion of a pivot pin which both secures said pedestal-type support apparatus to such transportation vehicle and enables said pedestal-type support apparatus to be pivoted from an inoperative cargo shipping container supporting position into an operative cargo shipping container supporting position; and (e) a counterweight means disposed intermediate and connected to a portion of each said inner surface of said pair of side wall portions and adjacent said second end of said pair of side wall portions for providing a predetermined force required to pivot said pedestal-type support apparatus from said inoperative shipping container supporting position into said operative shipping container supporting position.

2. A castable pedestal-type support apparatus, according to claim 1, wherein said connecting wall portion extends from said inner surface of said end wall portion to a predetermined portion of an outer surface of said pivot pin receiving portion.

3. A castable pedestal-type support apparatus, according to claim 2, wherein said body member further includes a pair of reinforcing wall portions having a predetermined configuration disposed at said first end of said pair of side wall portions, a first of said reinforcing wall portions being disposed on a first side of said connecting wall portion and a second of said reinforcing wall portions being disposed on an axially opposed second side of said connecting wall portion.

4. A castable pedestal-type support apparatus, according to claim 3, wherein said predetermined configuration of each of said pair of reinforcing wall portions is substantially triangularly shaped, a first leg of each triangularly shaped reinforcing wall portion being connected to a portion of an outer surface of said connecting wall portion and a second leg of said triangularly shaped reinforcing wall portion being connected to a portion of said inner surface of said end wall portion of said body member.

5. A castable pedestal-type support apparatus, according to claim 1, wherein said aperture formed through said pivot pin receiving portion is generally round and has a diameter of between about 2.260 inches and about 2.275 inches.

6. A castable pedestal-type support apparatus, according to claim wherein said predetermined force required to pivot said pedestal-type support apparatus provided by said counterweight means will generally be less than about 65 pounds.

7. A castable pedestal-type support apparatus, according to claim 1, wherein said body member and said pivot pin receiving portion and said counterweight means are cast as an integral single piece unit.

8. A castable pedestal-type support apparatus, according to claim 7, wherein at least a first portion of said aperture formed through said pivot pin receiving portion is cast simultaneously with said integral single piece unit.

9. A castable pedestal-type support apparatus, according to claim 8, wherein a final second portion of said aperture formed through said pivot pin receiving portion is machined to a final diameter.

10. A castable pedestal-type support apparatus, according to claim 7, wherein said at least one aperture formed through said end wall portion of said body member is simultaneously cast with said integral single piece unit.

11. A castable pedestal-type support apparatus, according to claim wherein said at least one aperture formed through said end wall portion of said body member is formed by drilling.

12. A castable pedestal-type support apparatus, according to claim 11, wherein said aperture formed through said pivot pin receiving portion is formed by drilling.

13. A castable pedestal-type support apparatus, according to claim 1, wherein said counterweight means is a thickened wall section.

14. A castable pedestal-type support apparatus, according to claim 1, wherein said substantially flat outer surface of said end wall portion includes a cavity, having a predetermined configuration, formed therein.

15. A castable pedestal-type support apparatus, according to claim 14, wherein said predetermined configuration of said cavity formed in said outer surface of said end wall portion includes a generally rectangular portion.

16. A castable pedestal-type support apparatus, according to claim 15, wherein said predetermined configuration of said cavity formed in said outer surface of said end wall portion further includes a first generally round portion having a first predetermined diameter and a first predetermined depth and a second generally round portion having a second predetermined diameter and a second predetermined depth.

17. A castable pedestal-type support apparatus, according to claim 16, wherein said first predetermined diameter of said first round portion of said cavity is less than said second predetermined diameter of said second round portion of said cavity.

18. A castable pedestal-type support apparatus, according to claim 17, wherein said first predetermined depth of said first round portion of said cavity is greater than said second predetermined depth of said second round portion of said cavity.

19. A castable pedestal-type support apparatus, according to claim 14, wherein said end wall portion further includes a plurality of bolt receiving apertures formed therethrough to enable bolting such predetermined locking mechanism to said pedestal-type support.

20. A castable pedestal-type support apparatus, according to claim 14, wherein said castable pedestal-type support apparatus further includes at least one handle member disposed intermediate a portion of an inner surface of each of said side wall portions.

* * * * *

UNITED STATES PATENT AND TRADEMARK OFFICE
CERTIFICATE OF CORRECTION

PATENT NO. : 5,161,927

DATED : November 10, 1992

INVENTOR(S) : Peter Scott Mautino

It is certified that error appears in the above-identified patent and that said Letters Patent is hereby corrected as shown below:

Column 10, line 7, after claim, insert --1--.

Column 10, line 30, after claim, insert --1--.

Signed and Sealed this

Nineteenth Day of October, 1993

Attest:

BRUCE LEHMAN

Attesting Officer

Commissioner of Patents and Trademarks